Dec. 25, 1945.  R. A. DAILY  2,391,820
STORAGE BATTERY
Original Filed Feb. 17, 1943
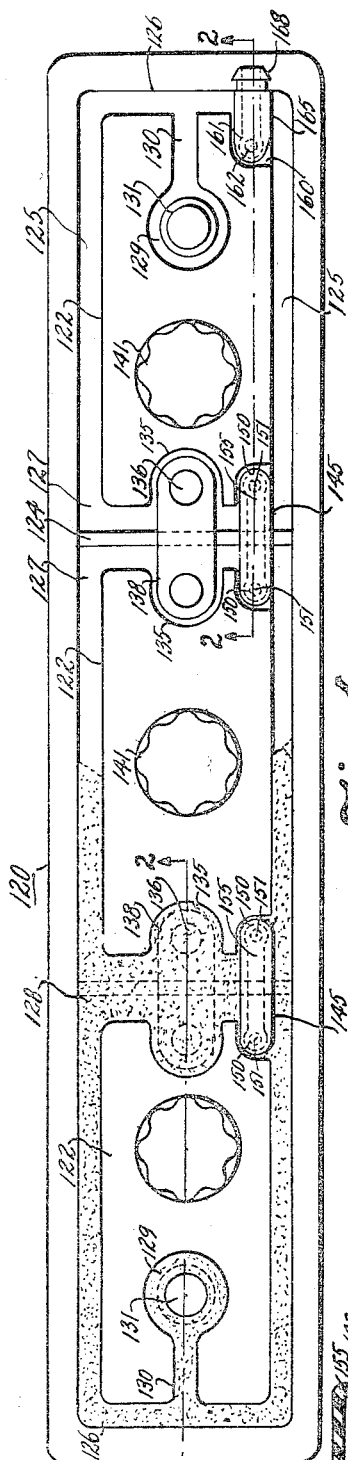
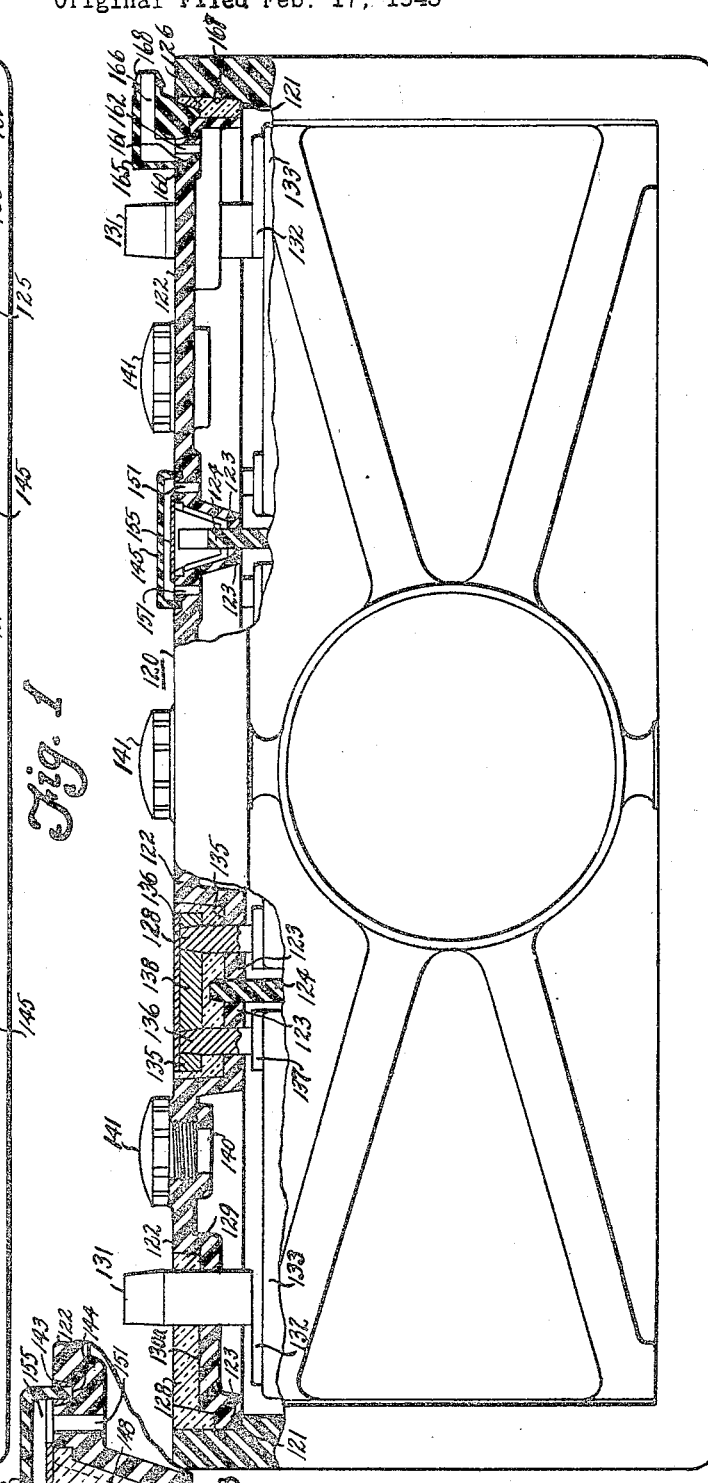
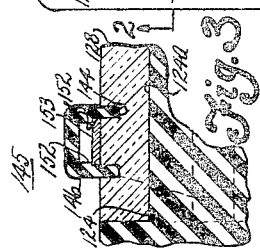
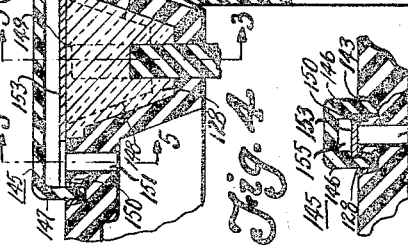
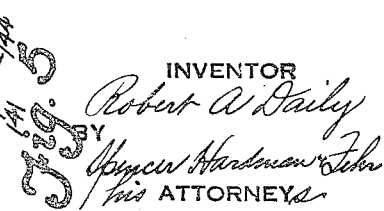
INVENTOR
Robert A. Daily
BY Spencer Hardman Lehr
his ATTORNEYS Patented Dec. 25, 1945

2,391,820

UNITED STATES PATENT OFFICE 2,391,820

STORAGE BATTERY

Robert A. Daily, Muncie, Ind., assignor to General Motors Corporation, Detroit, Mich., a corporation of Delaware Original application February 17, 1943, Serial No. 476,183. Divided and this application March 21, 1945, Serial No. 583,985

3 Claims. (Cl. 136—177)

This invention relates to storage batteries and its object is to provide a multi-cell storage battery having sealed-in inter-cell and end-cell vent members, which are sealed in place concurrently with sealing the battery cell covers and terminal posts.

This invention is a division of my copending application Serial No. 476,183 filed February 17, 1943.

Further objects and advantages of the present invention will be apparent from the following description, reference being had to the accompanying drawing wherein a preferred embodiment of the present invention is clearly shown.

In the drawing:

Figure 1 is a plan view of a storage battery having sealing compound permanently bonded to the box, cell covers, cell terminals, inter-cell terminal connectors, intercell vent members and an end cell vent member.

Figure 2 is a side view of the battery shown in Figure 1, certain parts being shown in section, the sections being taken on lines 2—2 of Fig. 1.

Figure 3 is a sectional view on lines 3—3 of Figure 4.

Figure 4 is an enlarged sectional view of a portion shown to the right of the center of Figure 2.

Figure 5 is a sectional view on lines 5—5 of Figure 4.

The battery box 120 has its side and end walls shaped to provide shelves or ledges 121 for receiving covers 122 having flanges 123 resting upon the ledges 121. The cell partitions 124 extend between adjacent cover flanges 123 which closely fit the partitions. The box and covers are shaped to provide side grooves 125, end grooves 126 and intermediate grooves 127 for receiving the sealing compound 128. Each end cover 122 is shaped to provide a circular channel 129 merging with a straight channel 130 which merges with end grooves 126. The bottoms of channels 129 and 130 are located above the bottoms of the end grooves 126 as indicated at 130a at the upper left-hand corner of Figure 2. Each circular channel surrounds an end terminal post 131 having a foot 132 connected with a group of battery plates 133. Each of the intermediate grooves 127 merges with a recess 135 which surrounds a terminal post 136 having a foot 137 connected with another group of plates, not shown, but understood to be hidden by the group 133 in Figure 2. The bottoms of the recesses 135 are flush with the bottoms of grooves 127, and each bottom of recess 135 is provided with a hole for receiving a terminal post 136. Each adjacent pair of posts 136 is connected by a strap 138, the top surface of which is below the top surface of the covers 122. Each cover 122 has a filler opening 140 closed by a screw plug 141 which is not provided with any vent hole.

As shown in Figures 3 and 4, the covers 122 are each provided with the shallow groove 143 for receiving a portion of the lower edge 144 of an acid-resisting member 145 having side walls 146 and end walls 147 (Figures 4 and 5). Member 145 resembles somewhat an inverted boat. Each side wall 146 is provided with a pair of depending lugs 148 separated by a notch 149 which receives a partition 124, the top edge 124a of which is located below the strap after it has been attached to posts 136. The grooves 143 which merge with the grooves 125 and 127 have their bottoms at a higher elevation than the bottoms of the grooves 125 and 127. Each groove 143 surrounds a tubular boss 150 through which a vent passage 151 is provided. Each side wall 146 is provided with a shoulder or ledge 152 and a plate 153, which may be made of acid-resisting metal rubber or other non-metallic acid-resisting material, is press-fitted between the side walls 146 and bears against the shoulders 152. This plate 153 cooperates with the top wall of the part 145 to define a channel 155 (Figure 4) which connects the vent passage 151 of one cell cover with the vent passage 151 of the cell cover adjacent thereto.

The right end cell cover 122 is provided at its lower right-hand corner with a groove 160 merging with grooves 125 and 126 and surrounding a tubular boss 161 through which a vent hole 162 is formed. An acid-resisting block 165 rests upon the bottom of the groove 160 with the boss 161 extending into the angular passage 166 provided in said block. The block 165 has an extension 167 engaging a right end wall portion of cover 122 which defines groove 126. Passage 166 extends through a tubular extension 168 of the block 165 to receive a tube of rubber or other acid-resisting flexible material through which fumes and vapors from the battery may be conducted away. Passage 166 can be anywhere around the periphery of the battery. Block 165 could be omitted and the part 145 could be provided with tubular extension 168 having passage 166 connected with channel 155 of part 145.

Before the cell covers are assembled with the box, the plate and separate groups are placed in cells of the box and then covers 122 are assembled with the box as shown. Then the straps 138 are placed upon the post 136 as shown and are permanently joined by "burning." The straps 138 are located above the top edges of the partitions 124 and below the top surface of the covers. Before the parts 145 and 160 are assembled, the grooves 125, 126 and 127 between the box side walls and partitions and the sides of the covers, and all of recesses 135, 143 and 160 heretofore described and all of the battery terminal posts 131 and 136 and the straps 138, in fact every surface which is to receive the sealing compound 28 is given a brush coating of a bituminous sealing compound with a suitable solvent as described in my copending application referred to. After that has been done the undersides of the parts 145 and 160 are coated also with a solution of the sealing compound and the coated parts 145 and 160 are assembled as shown without waiting for the coating to dry.

After all of the coated surfaces of the assembled battery have been allowed to dry in air, the battery passes to a chamber where to rays of infra-red lamps are directed upon the surfaces to receive sealing compound in order to remove any remaining moisture. Following this treatment which lasts for about 36 seconds, the battery passes out into the open where a portion of the sealing compound is poured in so that the seal grooves are about half full. Then the battery passes into the second chamber where the rays of a greater number of infra-red lamps impinge upon the grooves, channels and recesses and all of the parts which have been coated, and this treatment is continued for about 72 seconds. Then the battery passes out into the open where the remainder of the sealing compound is poured into the grooves, channels and recesses with the result that the traps 138 are submerged and the surfaces of the sealing compound reach the underside of the plates 153 of parts 145 as shown in Figure 2. Each plate 153 serves the block off the entrance of sealing compound into the groove 155 so that the passage of the battery vapors under pressure from one cell to the other is not obstructed. The application of the precoating of sealing compound provides such a bond between the sealing compound poured in and the contacted surfaces of the non-metallic and metal parts that all joints are permanently sealed and therefore are leak-proof. An effective seal is provided not only between the cell covers and the sides and partitions of the box, but also an effective seal is provided around each terminal post so that battery liquid cannot escape. The bond is of such nature that when the battery is subjected to severe vibration, as in an automobile or airplane or tank, the seal is not disrupted.

The sealing method, which is described in more detail in my copending application referred to, can be used in sealing containers and covers made of rubber and substances other than rubber, such as glass, enamelled steel and molded plastic compounds, particularly thermal setting plastic compounds which are acid-resisting.

If the plastic compound has a high melting point, it is possible to omit the infra-red treatment and yet obtain a satisfactory bond between the compound and the precoated metallic and non-metallic parts, because the heat of the melted compound is sufficient to cause it to fuse with the precoating layer of the compound and to expel traces of the solvent used in the precoating solution. If a compound having relatively lower melting point is used, the precoated surfaces should be heated in the manner disclosed. It is certain that, when the infra-red ray treatment is used, a satisfactory bond will be obtained for both types of sealing compound.

While the embodiment of the present invention as herein disclosed constitutes a preferred form, it is to be understood that other forms may be adopted, all coming within the scope of the claims which follow.

What is claimed is as follows:

1. A storage battery comprising a box having a plurality of cells, covers for the cells providing cell vents, intercell vent bodies connecting the vents in the covers, a terminal cell vent body connected with a vent in a cover, said covers having grooves receiving portions of the vent bodies and sealing compound in the grooves permanently bonded to the vent bodies and covers, said sealing compound having anchorage portions locked into the pores of the contacted surfaces of the vent bodies and covers.

2. The method of making a storage battery including a box having partitions forming a plurality of cells, which comprises the steps of placing plate groups having terminal posts in the cells, placing covers over the plate groups, said covers having been shaped to provide sealing-compound-receiving grooves at the joints between the covers and the sides, ends and partitions of the box and to provide holes for receiving the terminal posts and to provide sealing-compound-receiving grooves surrounding the posts and in communication with the first-mentioned grooves of the covers and to provide vent passages through tubular bosses surrounded by sealing-compound-receiving grooves which are in communication with the first-mentioned grooves of the covers, attaching intercell connectors to adjacent terminal posts, coating all posts, intercell connectors and surfaces of sealing-compound-receiving grooves with a solution of sealing compound with a volatile solvent in order to carry the sealing compound into the pores of the contacted surfaces and to expel the air therefrom, coating vent bodies with said solution of the sealing compound, said vent bodies having been shaped to connect with tubular vent bosses of the covers and which are provided with edges received by the grooves surrounding the tubular vent bosses, placing the vent bodies upon the covers with their last-mentioned grooves receiving coated edges of the vent bodies, drying the coating, and pouring into the grooves a heated sealing compound.

3. In a storage battery, the combination with a plurality of cells and cover therefor, the covers and cells providing sealing-compound-receiving grooves extending substantially below the top surfaces of the covers, vents for the covers surrounded by annular bosses provided by the covers, the bosses being surrounded by shallow grooves in the covers extending below the top surfaces of the covers and communicating with the grooves first mentioned, an intercell vent connector provided by an inverted boat-like body having its lower edge portion received by the grooves surrounding the vent bosses of adjacent covers and by adjacent ones of the grooves first mentioned and having its top wall located above the upper surface of the covers, sealing-compound received by all the grooves and extending to the top wall of the covers, and a baffle plate carried by the connector and located in spaced relation to the top wall thereof to provide a passage connecting adjacent cell vents.

ROBERT A. DAILY.